United States Patent
Cheng

(10) Patent No.: US 10,163,051 B1
(45) Date of Patent: Dec. 25, 2018

(54) PORTABLE CARD WITH TRANSACTION DISPLAY FUNCTION

(71) Applicant: BEAUTIFUL CARD CORPORATION, Taoyuan (TW)

(72) Inventor: Meng-Jen Cheng, Taoyuan (TW)

(73) Assignee: BEAUTIFUL CARD CORPORATION (TW)

( * ) Notice: Subject to any disclaimer, the term of this patent is extended or adjusted under 35 U.S.C. 154(b) by 0 days.

(21) Appl. No.: 15/997,871

(22) Filed: Jun. 5, 2018

(30) Foreign Application Priority Data

Dec. 18, 2017 (TW) .............................. 106218776 U

(51) Int. Cl.
| | |
|---|---|
| G06K 19/00 | (2006.01) |
| G06K 19/077 | (2006.01) |
| G06F 3/147 | (2006.01) |

(52) U.S. Cl.
CPC ....... *G06K 19/07743* (2013.01); *G06F 3/147* (2013.01)

(58) Field of Classification Search
CPC ........ G06K 19/00; G06K 19/04; G06K 19/06; G06K 5/00; G06F 17/00
USPC .................................. 235/492, 380, 375, 487
See application file for complete search history.

(56) References Cited

U.S. PATENT DOCUMENTS

| | | | | |
|---|---|---|---|---|
| 2005/0045729 | A1* | 3/2005 | Yamazaki .......... | G06K 19/0704 235/492 |
| 2006/0049263 | A1* | 3/2006 | Ou ........................ | G06K 19/07 235/492 |
| 2009/0033488 | A1* | 2/2009 | Suzuki ............... | G06K 19/0716 340/540 |
| 2015/0178718 | A1* | 6/2015 | Liu ........................ | G07F 7/125 705/67 |
| 2017/0330173 | A1* | 11/2017 | Woo ................... | G06K 19/0718 |

* cited by examiner

*Primary Examiner* — Edwyn Labaze
(74) *Attorney, Agent, or Firm* — Schmeiser, Olsen & Watts, LLP

(57) ABSTRACT

A portable card with transaction display function includes a card body; a microprocessor arranged on the card body; a contact communication unit, a transaction display mode control unit and a power supply unit having a contactless RF antenna, all arranged on the card body and electrically connected to the microprocessor; a transaction display unit arranged on the card body and electrically connected to the transaction display mode control unit. When making a contactless transaction, approach the card body to a read module and the contactless RF antenna of the power supply unit reads electromagnetic wave from the read module and gets induced electric current to enable the transaction. When making a contact transaction, insert the card body into a card reader for the latter to read the contact communication unit and enable the transaction. During the transaction, the transaction display unit will output a transaction message as a notice.

10 Claims, 3 Drawing Sheets

PORTABLE CARD WITH TRANSACTION DISPLAY FUNCTION

CROSS-REFERENCE TO RELATED APPLICATION

This non-provisional application claims priority under 35 U.S.C. § 119(a) on Patent Application No(s). 106218776 filed in Taiwan, R.O.C. on Dec. 18, 2017, the entire contents of which are hereby incorporated by reference.

FIELD OF THE INVENTION

The present invention relates to a portable card, and more particularly, to a portable card with transaction display function.

BACKGROUND OF THE INVENTION

The commonly used portable cards, such as financial cards, credit cards, stored-value cards, easy cards, health insurance IC cards, citizen digital certificates and so on, can be divided into contact cards and contactless cards according to the manner in which the cards are used. A contact card has a security chip exposed from the card surface for electrical contacting with an external card reader, so that the card reader can read required data from the security chip to perform a transaction with the card. On the other hand, a contactless card has an induction coil and a unique radio-frequency identification (RFID) tag embedded therein. When a user approaches the contactless card to a read module, an electromagnetic induction occurs between an antenna of the read module and the induction coil in the contactless card to produce induced electric current, allowing the read module to read data in the RFID tag for performing a required transaction.

However, the conventional contactless cards or contact cards do not include any system for providing a notice to a consumer, and the consumer can usually be informed by the store whether a transaction has been completed without the possibility of knowing the transaction state directly from the card being used. Therefore, the consumer's personal and transaction data in the RFID tag are subjected to the risk of being stolen by a malicious store using some kind of machine during or after the transaction.

It is therefore tried by the inventor to improve the prior art portable cards by developing a portable card with transaction display function, which is able to output a transaction message as a notice during a transaction using the portable card.

SUMMARY OF THE INVENTION

In view of the disadvantages of the prior art portable cards, a primary object of the present invention is to provide a portable card with transaction display function, which is able to display a transaction message as a notice during a transaction using the portable card.

To achieve the above and other objects, the portable card with transaction display function according to a preferred embodiment of the present invention includes a card body; a microprocessor arranged on the card body; a power supply unit arranged on the card body and electrically connected to the microprocessor, and including a contactless RF antenna; a contact communication unit arranged on the card body and electrically connected to the microprocessor; a transaction display mode control unit arranged on the card body and electrically connected to the microprocessor; and a transaction display unit arranged on the card body and electrically connected to the transaction display mode control unit.

The portable card with transaction display function according to the present invention can further include a rectifier and stabilizer unit, which is arranged on the card body and electrically connected to between the microprocessor and the power supply unit.

In the portable card with transaction display function according to the present invention, the transaction display unit includes at least one of a light-emitting element and a display.

In the portable card with transaction display function according to the present invention, the card body includes a carrier, a front printed layer, a front transparent protective layer, a back printed layer, and a back transparent protective layer. The microprocessor, the power supply unit, the contact communication unit, the transaction display mode control unit and the transaction display unit are arranged on the carrier. The front printed layer is disposed on a front side of the carrier, the front transparent protective layer is disposed on a top side of the front printed layer, the back printed layer is disposed on a back side of the carrier, and the back transparent protective layer is disposed on a top side of the back printed layer.

In the portable card with transaction display function according to the present invention, the front printed layer and the front transparent protective layer are simultaneously provided with a window, which are located corresponding to the contact communication unit.

In the portable card with transaction display function according to the present invention, the front printed layer is provided with at least another window, which is located corresponding to the transaction display unit; or, the front printed layer and the front transparent protective layer can be simultaneously provided with at least one another window, which are located corresponding to the transaction display unit.

In the portable card with transaction display function according to the present invention, the front printed layer includes a pattern layer and a colored layer; and the pattern layer is disposed on a top of the colored layer.

In the portable card with transaction display function according to the present invention, the colored layer can be a white layer, a silver layer, a white layer over a black layer, a silver layer over a black layer, or a white layer over a silver layer.

In the portable card with transaction display function according to the present invention, the carrier can be a flexible printed circuit (FPC), a printed circuit board (PCB) or an FR-4 (flame retardant grade 4) PCB.

In the portable card with transaction display function according to the present invention, the front printed layer, the front transparent protective layer, the back printed layer and the back transparent protective layer can be made of an ABS (acrylonitrile butadiene styrene) material, a PETG (polyethylene terephthalate glycol-modified) material, a PVC (polyvinyl chloride) material or a PET (polyethylene terephthalate) material.

Whereby, when making a contactless transaction using the portable card with transaction display function according to the present invention, simply approach the card body to a read module and the contactless RF antenna of the power supply unit can read electromagnetic wave from the read module and get induced electric current to enable the transaction; or when making a contact transaction, simply insert the card body into a card reader for the latter to read the contact communication unit and enable the transaction. Further, during the transaction, the transaction display unit will output a transaction message to achieve the purpose of providing a notice to the user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
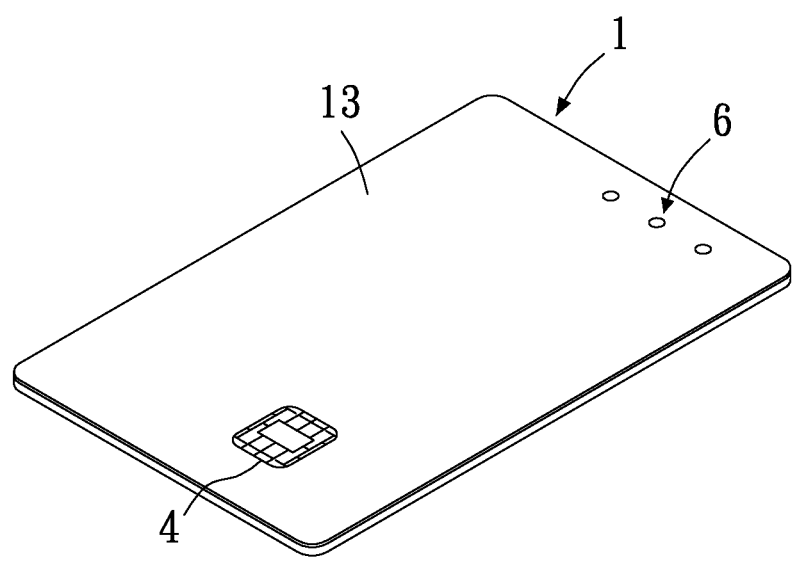
FIG. 1 is an assembled perspective view of a portable card with transaction display function according to a preferred embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
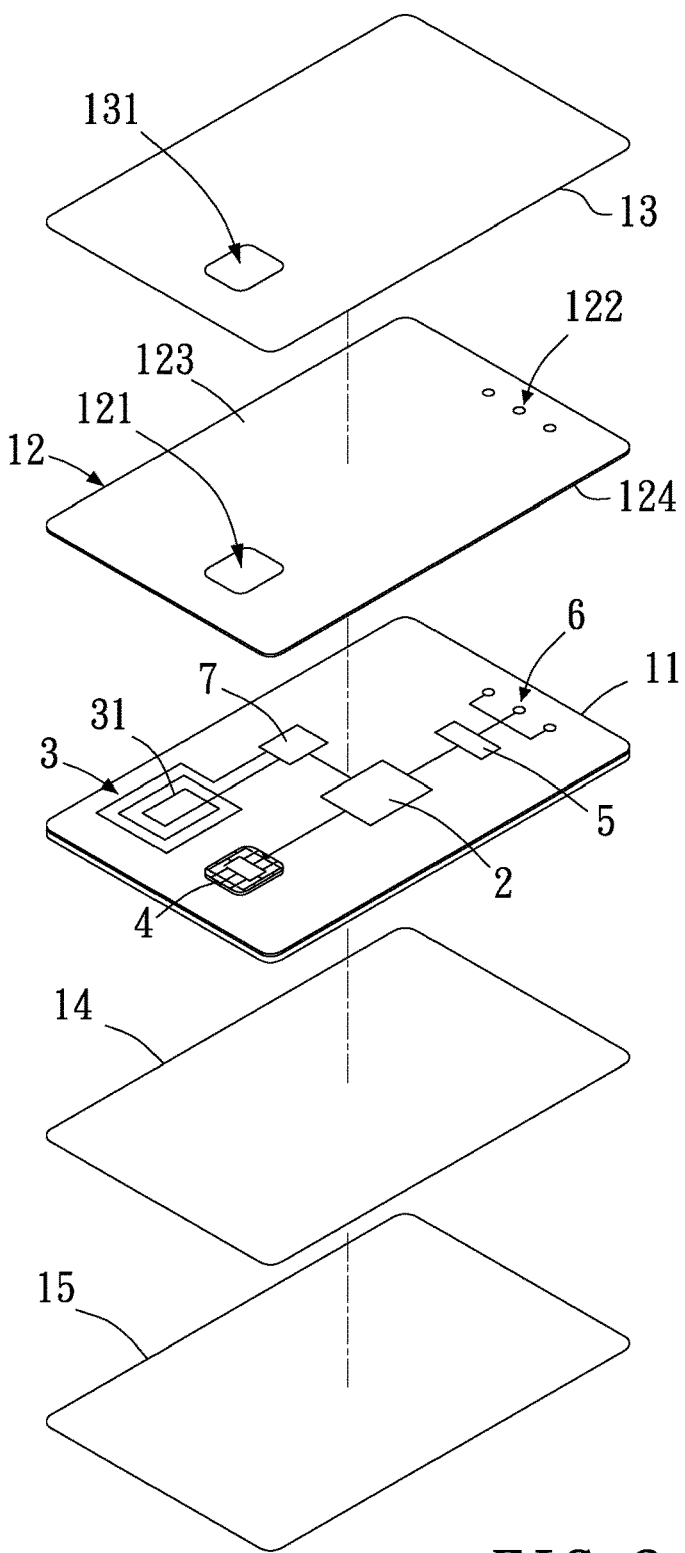
FIG. 2 is an exploded view of FIG. 1.
Figure 3:
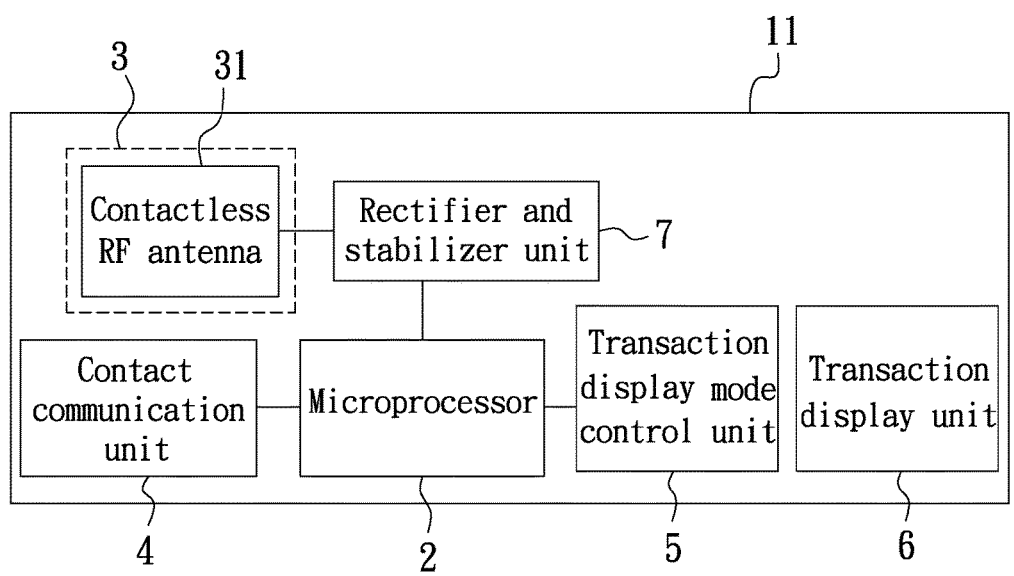
FIG. 3 is a block diagram of the portable card with transaction display function according to the preferred embodiment of the present invention.

Please refer to FIGS. 1 to 3. A portable card with transaction display function according to a preferred embodiment of the present invention includes at least a card body 1, a microprocessor 2, a power supply unit 3, a contact communication unit 4, a transaction display mode control unit 5, and a transaction display unit 6.

The microprocessor 2 is arranged on the card body 1 for storing a user's personal data and transaction data, and performing computation process during a transaction with the portable card.

The power supply unit 3 is arranged on the card body 1 and electrically connected to the microprocessor 2, and includes a contactless radio-frequency (RF) antenna 31.

The contact communication unit 4 is arranged on the card body 1 and electrically connected to the microprocessor 2, and can be an integrated circuit (IC) chip.

The transaction display mode control unit 5 is arranged on the card body 1 and electrically connected to the microprocessor 2.

The transaction display unit 6 is arranged on the card body 1 and electrically connected to the transaction display mode control unit 5. The transaction display mode control unit 5 can be a control circuit for controlling a display mode of the transaction display unit 6.

When using the portable card of the present invention to perform a contactless transaction, a user first approaches the card body 1 to a read module (not shown), allowing the contactless RF antenna 31 of the power supply unit 3 to read the electromagnetic wave from the read module, so that induced electric current is produced for the portable card to operate. The microprocessor 2 is enabled by the induced electricity to exchange the user's personal data and transaction data with the read module. Meanwhile, the microprocessor 2 drives the transaction display mode control unit 5 to control the transaction display unit 6 to output a transaction message in a preset transaction display mode, informing the user/consumer the transaction is under processing. When the transaction is completed and the card body 1 is moved away from the read module, the contactless RF antenna 31 of the power supply unit 3 can no longer read any electromagnetic wave from the read module, and the card body 1 goes into an electrical disconnected state, which in turn brings the microprocessor 2, the transaction display mode control unit 5 and the transaction display unit 6 to an inactive state, and the transaction display unit 6 no longer outputs any transaction message, so as to notice the user/consumer the current transaction has ended and the portable card is now in a non-use state. With these arrangements, it is able to prevent an unworthy store from keeping using the portable card after the transaction has ended.

When using the portable card of the present invention to perform a contact transaction, the user first inserts the card body 1 into a card reader (not shown), allowing the contact communication unit 4 to electrically contact with the card reader, so that the card reader supplies electricity to the portable card via the contact communication unit 4 and reads the user's personal data and transaction data. The microprocessor 2 is enabled by the electricity to exchange the user's personal data and transaction data with the card reader. Meanwhile, the microprocessor 2 drives the transaction display mode control unit 5 to control the transaction display unit 6 to output a transaction message in a preset transaction display mode, informing the user/consumer the transaction is under processing. When the transaction is completed and the card body 1 is removed from the card reader, the contact communication unit 4 can no longer contact with the card reader, and the card body 1 goes into an electrical disconnected state, which in turn brings the microprocessor 2, the transaction display mode control unit 5 and the transaction display unit 6 to an inactive state, and the transaction display unit 6 no longer outputs any transaction message, so as to notice the user/consumer the current transaction has ended and the portable card is now in a non-use state. With these arrangements, it is able to prevent an unworthy store from keeping using the portable card after the transaction has ended.

According to an operable embodiment of the present invention, the card body 1 includes a carrier 11, a front printed layer 12, a front transparent protective layer 13, a back printed layer 14, and a back transparent protective layer 15. The microprocessor 2, the power supply unit 3, the contact communication unit 4, the transaction display mode control unit 5 and the transaction display unit 6 are arranged on the carrier 11. The front printed layer 12 is disposed on a front side of the carrier 11 to cover the microprocessor 2, the power supply unit 3 and the transaction display mode control unit 5. The front transparent protective layer 13 is disposed on a top side of the front printed layer 12. The back printed layer 14 is disposed on a back side of the carrier 11, and the back transparent protective layer 15 is disposed on a top side of the back printed layer 14. The front printed layer 12 and the front transparent protective layer 13 are simultaneously provided with a window 121, 131, respectively, which are located corresponding to the contact communication unit 4. The front printed layer 12 is also provided with at least another window 122, which is located corresponding to the transaction display unit 6. In an operable embodiment, the front transparent protective layer 13 can also be provided with at least another window (not shown), which is located corresponding to the transaction display unit 6. In the illustrated preferred embodiment, only the front printed layer 12 is provided with another window 122. The carrier 11 can be a flexible printed circuit (FPC), a printed circuit board (PCB) or an FR-4 (flame retardant grade 4) PCB. The front printed layer 12, the front transparent protective layer 13, the back printed layer 14 and the back transparent protective layer 15 can be made of an ABS (acrylonitrile butadiene styrene), a PETG (polyethylene terephthalate glycol-modified), a PVC (polyvinyl chloride) or a PET (polyethylene terephthalate) material.

According to an operable embodiment of the present invention, the front printed layer 12 can include a pattern layer 123 and a colored layer 124. The pattern layer 123 is disposed on a top of the colored layer 124. The colored layer 124 can be a white layer, a silver layer, a white layer over a black layer, a silver layer over a black layer, or a white layer over a silver layer, so that the front printed layer 12 can show a changeful multi-layer pattern.

According to an operable embodiment of the present invention, the portal card further includes a rectifier and stabilizer unit 7, which is arranged on the carrier 11 of the card body 1 and electrically connected to between the microprocessor 2 and the power supply unit 3. The rectifier and stabilizer unit 7 serves to stabilize voltage when the portable card is in use, lest the microprocessor 2 should be damaged due to unstable working voltage. The rectifier and stabilizer unit 7 can be covered by the front printed layer 12.

According to an operable embodiment of the present invention, the transaction display unit 6 includes at least a light-emitting element or a display. The light-emitting element can be a light-emitting diode (LED); and the display can be a liquid-crystal display (LCD). In the illustrated preferred embodiment, the transaction display unit 6 is a light-emitting element. When producing the portable card, a transaction display mode for the transaction display unit 6, such as to emit light steadily, to emit blinking light, to emit light in cycles, or to change light colors, can be preset in the transaction display mode control unit 5, so as to use the transaction display unit 6 to output a transaction message in a preset mode.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

The claims are as follows:

1. A portable card with transaction display function, comprising:
   a card body;
   a microprocessor arranged on the card body;
   a power supply unit arranged on the card body and electrically connected to the microprocessor, and including a contactless RF antenna;
   a contact communication unit arranged on the card body and electrically connected to the microprocessor;
   a transaction display mode control unit arranged on the card body and electrically connected to the microprocessor; and
   a transaction display unit arranged on the card body and electrically connected to the transaction display mode control unit, wherein a display mode of the transaction display unit is controlled by the transaction display mode control unit;
   wherein when a user approaches the card body to a read module, or inserts the card body into a card reader, the microprocessor drives the transaction display mode control unit to control the transaction display unit to output a transaction message in a preset transaction display mode, informing the user a transaction is under processing; when the transaction is completed and the card body is moved away from the read module, or removed from the card reader, the card body goes into an electrical disconnected state, which in turn brings the microprocessor, the transaction display mode control unit and the transaction display unit to an inactive state, and the transaction display unit no longer outputs any transaction message.

2. The portable card with transaction display function as claimed in claim 1, further comprising a rectifier and stabilizer unit, which is arranged on the card body and electrically connected to between the microprocessor and the power supply unit.

3. The portable card with transaction display function as claimed in claim 1, wherein the transaction display unit includes at least one of a light-emitting element and a display.

4. The portable card with transaction display function as claimed in claim 1, wherein the card body includes a carrier, a front printed layer, a front transparent protective layer, a back printed layer, and a back transparent protective layer; the microprocessor, the power supply unit, the contact communication unit, the transaction display mode control unit and the transaction display unit being arranged on the carrier; and the front printed layer being disposed on a front side of the carrier, the front transparent protective layer being disposed on a top side of the front printed layer, the back printed layer being disposed on a back side of the carrier, and the back transparent protective layer being disposed on a top side of the back printed layer.

5. The portable card with transaction display function as claimed in claim 4, wherein the front printed layer and the front transparent protective layer are simultaneously provided with a window, which are located corresponding to the contact communication unit.

6. The portable card with transaction display function as claimed in claim 4, wherein the front printed layer is provided with at least another window, which is located corresponding to the transaction display unit; or, the front printed layer and the front transparent protective layer being simultaneously provided with at least another window, which are located corresponding to the transaction display unit.

7. The portable card with transaction display function as claimed in claim 4, wherein the front printed layer includes a pattern layer and a colored layer; and the pattern layer being disposed on a top of the colored layer.

8. The portable card with transaction display function as claimed in claim 7, wherein the colored layer is selected from the group consisting of a white layer, a silver layer, a white layer over a black layer, a silver layer over a black layer, and a white layer over a silver layer.

9. The portable card with transaction display function as claimed in claim 4, wherein the carrier is selected from the group consisting of a flexible printed circuit (FPC), a printed circuit board (PCB) and an FR-4 (flame retardant grade 4) PCB.

10. The portable card with transaction display function as claimed in claim 4, wherein the front printed layer, the front transparent protective layer, the back printed layer and the back transparent protective layer are made of a material selected from the group consisting of an ABS (acrylonitrile butadiene styrene) material, a PETG (polyethylene terephthalate glycol-modified) material, a PVC (polyvinyl chloride) material and a PET (polyethylene terephthalate) material.

* * * * *